United States Patent
Foster et al.

(10) Patent No.: US 10,153,543 B2
(45) Date of Patent: Dec. 11, 2018

(54) ANTENNA MOUNTING ARRANGEMENT FOR AN OFF-ROAD VEHICLE

(71) Applicants: CNH Industrial America LLC, New Holland, PA (US); Autonomous Solutions, Inc., Mendon, UT (US)

(72) Inventors: Christopher Alan Foster, Mohnton, PA (US); Frank George Rabusic, Mount Pleasant, WI (US); Eric Michael Jacobsthal, Elmhurst, IL (US); Frank Zsigmond Asztalos, Orchard Lake, MI (US); Brett Carson McClelland, Chicago, IL (US); Matthew Huenemann, Racine, WI (US); John Henry Posselius, Ephrata, PA (US); Dwayne St. George Jackson, Plainsfield, IL (US); John Bradley Lukac, St. John, IN (US); Bret Todd Turpin, Wellsville, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 29 days.

(21) Appl. No.: 15/178,730

(22) Filed: Jun. 10, 2016

(65) Prior Publication Data

US 2017/0358852 A1    Dec. 14, 2017

(51) Int. Cl.
| | |
|---|---|
| *H01Q 1/32* | (2006.01) |
| *G05D 1/00* | (2006.01) |
| *G05D 1/02* | (2006.01) |
| *H01Q 1/42* | (2006.01) |

(52) U.S. Cl.
CPC ......... *H01Q 1/3283* (2013.01); *H01Q 1/3208* (2013.01); *G05D 1/0088* (2013.01); *G05D 1/0278* (2013.01); *H01Q 1/42* (2013.01)

(58) Field of Classification Search
CPC .... H01Q 1/3275; H01Q 21/29; H01Q 21/293; H01Q 25/005; H01Q 9/0407; H01Q 9/28
See application file for complete search history.

(56) References Cited

U.S. PATENT DOCUMENTS

| | | | | |
|---|---|---|---|---|
| 7,158,884 | B2 * | 1/2007 | Takahashi | G01S 19/01 224/413 |
| 7,183,519 | B2 * | 2/2007 | Horiyama | B62J 33/00 219/202 |
| 7,880,595 | B2 * | 2/2011 | Shimura | B60C 23/007 340/431 |
| 2002/0120399 | A1 * | 8/2002 | Morita | B60C 23/006 343/713 |

FOREIGN PATENT DOCUMENTS

JP          2009055795 A    *  3/2009  ............ A01B 63/10

* cited by examiner

*Primary Examiner* — Tho G Phan
(74) *Attorney, Agent, or Firm* — Rebecca L. Henkel; Rickard K. DeMille

(57) ABSTRACT

An off-road vehicle includes a body having at least one fender positioned over at least one wheel or track of the off-road vehicle. The at least one wheel or track is configured to engage a ground surface. The off-road vehicle also includes at least one spatial locating antenna positioned beneath the at least one fender. A top side of the at least one fender is positioned above the at least one spatial locating antenna relative to the ground surface, and the top side extends beyond a lateral extent and a longitudinal extent of the at least one spatial locating antenna.

20 Claims, 4 Drawing Sheets

ANTENNA MOUNTING ARRANGEMENT FOR AN OFF-ROAD VEHICLE

BACKGROUND

The present disclosure relates generally to an antenna mounting arrangement for an off-road vehicle.

Certain agricultural vehicles, such as tractors or other prime movers, may be controlled by a control system (e.g., without operator input, with limited operator input, etc.) during certain phases of operation. For example, a controller may instruct a steering control system and/or a speed control system of the agricultural vehicle to automatically or semi-automatically guide the agricultural vehicle along a guidance swath through a field. To facilitate control of the agricultural vehicle, the controller may receive position information from a spatial locating device, such as a Global Position System (GPS) receiver. The GPS receiver is typically communicatively coupled to a GPS antenna mounted to an exterior surface of the agricultural vehicle. Unfortunately, mounting the GPS antenna to the exterior surface of the vehicle detracts from the appearance of the agricultural vehicle and exposes the GPS antenna to dirt/debris within the field.

BRIEF DESCRIPTION

In one embodiment, an off-road vehicle includes a body having at least one fender positioned over at least one wheel or track of the off-road vehicle. The at least one wheel or track is configured to engage a ground surface. The off-road vehicle also includes at least one spatial locating antenna positioned beneath the at least one fender. A top side of the at least one fender is positioned above the at least one spatial locating antenna relative to the ground surface, and the top side extends beyond a lateral extent and a longitudinal extent of the at least one spatial locating antenna.

In another embodiment, an off-road vehicle includes a body and at least one spatial locating antenna positioned beneath the body. A top side of the body is positioned above the at least one spatial locating antenna relative to a ground surface, and the top side extends beyond a lateral extent and a longitudinal extent of the at least one spatial locating antenna. In addition, the off-road vehicle includes a coating disposed on an outer surface of the top side of the body. The outer surface of the top side faces away from the at least one spatial locating antenna, and the coating includes a gap aligned with the at least one spatial locating antenna to facilitate passage of a spatial locating signal through the body to the at least one spatial locating antenna.

In a further embodiment, an off-road vehicle includes a body having a wall. The off-road vehicle also includes an antenna positioned on a first side of the wall. The antenna is configured to receive, transmit, or a combination thereof, a signal through the wall between the first side and a second side, opposite the first side. In addition, the off-road vehicle includes a coating disposed on an outer surface of the wall facing the second side. The coating includes a gap aligned with the antenna to facilitate passage of the signal through the wall.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
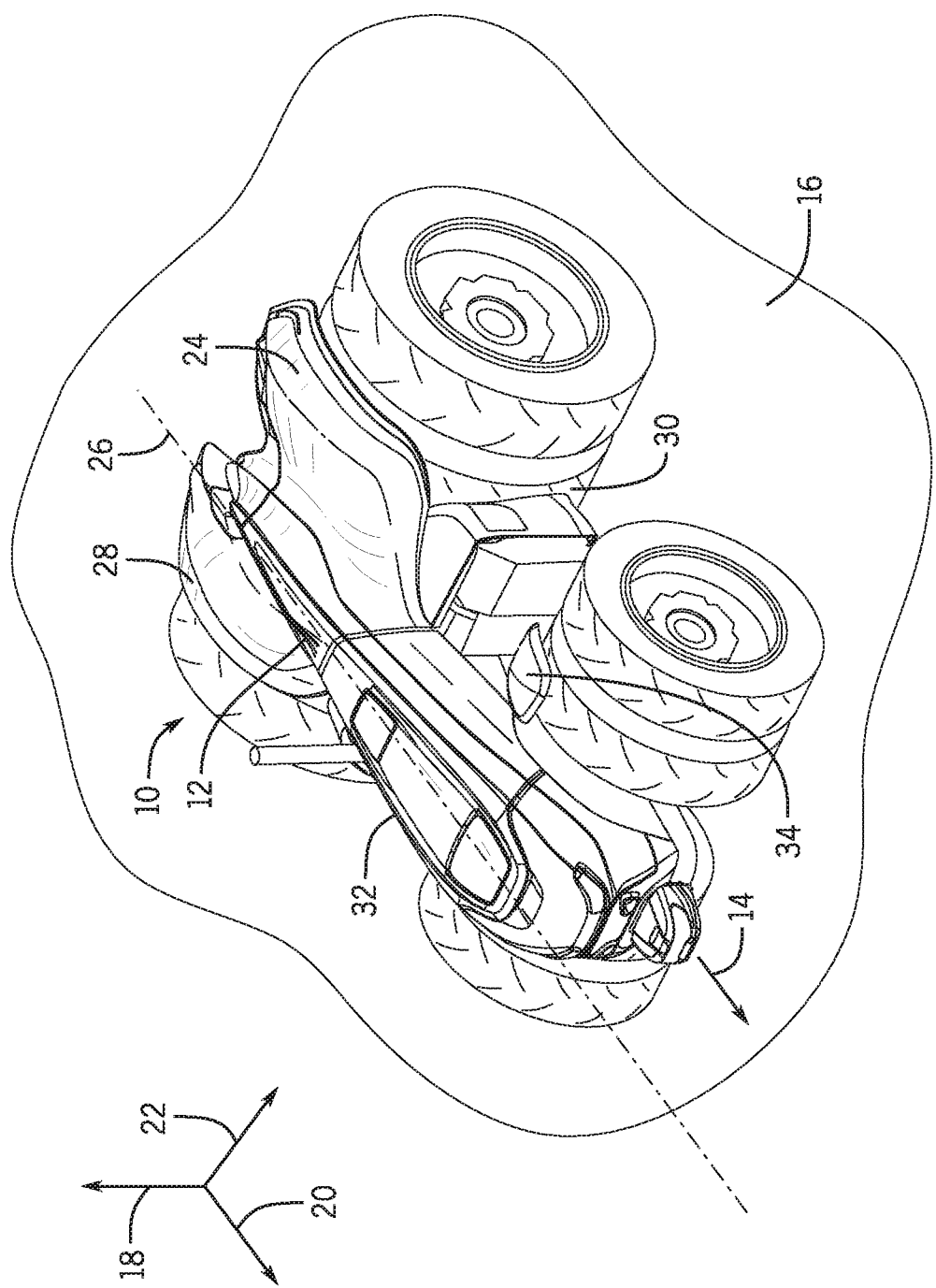
FIG. 1 is a perspective view of an embodiment of an autonomous agricultural vehicle that may include one or more antennas positioned under a body of the agricultural vehicle.

Turning now to the drawings, FIG. 1 is a perspective view of an embodiment of an autonomous agricultural vehicle 10 that may include one or more antennas positioned under a body 12 of the autonomous agricultural vehicle 10. The autonomous agricultural vehicle 10 includes a control system configured to automatically guide the agricultural vehicle 10 through a field (e.g., along a direction of travel 14) to facilitate agricultural operations (e.g., planting operations, seeding operations, application operations, tillage operations, harvesting operations, etc.). For example, the control system may automatically guide the autonomous agricultural vehicle 10 along a guidance swath through the field without input from an operator. The control system may also automatically guide the autonomous agricultural vehicle 10 around headland turns between segments of the guidance swath.

To facilitate control of the autonomous agricultural vehicle, the control system includes a spatial locating device, such as a Global Position System (GPS) receiver, which is configured to output position information to a controller of the control system. As discussed in detail below, the spatial locating device is communicatively coupled to at least one spatial locating antenna, which is configured to receive spatial locating signals. The spatial locating device is configured to determine the position and/or orientation of the autonomous agricultural vehicle based at least in part on the spatial locating signals.

In the illustrated embodiment, the spatial locating antenna(s) are positioned beneath the body 12 of the autonomous agricultural vehicle 10. Accordingly, each spatial locating antenna is positioned below a top side of the body relative to a ground surface 16 along a vertical axis 18. In certain embodiments, the top side of the body extends beyond a longitudinal extent of each spatial locating antenna (e.g., an extent of the spatial locating antenna along a longitudinal axis 20) and a lateral extent of the spatial locating antenna (e.g., an extent of the spatial locating antenna along a lateral axis 22). As a result, the top surface of the body 12 completely covers each spatial locating antenna. The body is formed from a material (e.g., fiberglass, a polymeric material, etc.) that facilitates passage of the spatial locating signals (e.g., GPS signals of about 1 GHz to about 2 GHz) through the body 12 to each spatial locating antenna. Positioning the spatial locating antenna(s) beneath the body 12 may enhance the appearance of the autonomous agricultural vehicle and/or protect the spatial locating antenna(s) from dirt/debris within the field.

In certain embodiments, a coating is disposed on an outer surface of the top side of the body 12. Certain coatings, such as metallic paints and/or paints containing a high carbon content may interfere with (e.g., at least partially block) the spatial locating signals. Accordingly, to facilitate passage of the spatial locating signals through the body 12 to each spatial locating antenna when such a coating is utilized, gap(s) aligned with the respective spatial locating antenna(s) are formed in the coating. In certain embodiments, a second coating is disposed on the outer surface of the top side of the body within the gap(s) to enhance the appearance of the autonomous agricultural vehicle 10. The second coating is configured to facilitate passage of the spatial locating signals to the spatial locating antenna(s). For example, the second coating may include a non-metallic paint and/or a paint having a low carbon content (e.g., less than 10 percent, less than 5 percent, less than 1 percent, etc.). Alternatively or additionally, the second coating may include a decal (e.g., a vinyl decal) disposed on the outer surface of the top side of the body within the gap.

In certain embodiments, at least one spatial locating antenna is positioned beneath at least one fender of the body 12. In the illustrated embodiment, the body 12 includes a first rear fender 24 on a first lateral side of a longitudinal centerline 26 of the autonomous agricultural vehicle 10. The body 12 also includes a second rear fender 28 on a second lateral side of the longitudinal centerline 26, opposite the first lateral side. As illustrated, each rear fender is positioned over a respective wheel, which is configured to engage the ground surface 16. While each rear fender is positioned over a single wheel, it should be appreciated that in alternative embodiments, one or more of the rear fenders may be positioned over two or more wheels. In addition, if the autonomous agricultural vehicle includes tracks, each rear fender may be positioned over one or more tracks. In certain embodiments, the control system includes a first spatial locating antenna positioned beneath the first rear fender 24 and a second spatial locating antenna positioned beneath the second rear fender 28. Positioning the spatial locating antennas beneath the rear fenders enables each spatial locating antenna to be positioned a greater distance from the longitudinal centerline 26 than spatial locating antennas positioned on a roof of an operator cab (e.g., because the lateral extent of the rear fenders is greater than the lateral extent of the operator cab). As a result, the accuracy of a vehicle orientation determined by the spatial locating receiver and/or the controller may be enhanced. In certain embodiments, at least one spatial locating antenna may be positioned beneath the hood 32 and/or the front fender(s) 34 of the autonomous agricultural vehicle 10 (e.g., in addition to the rear fenders or instead of the rear fenders).

Figure 2:
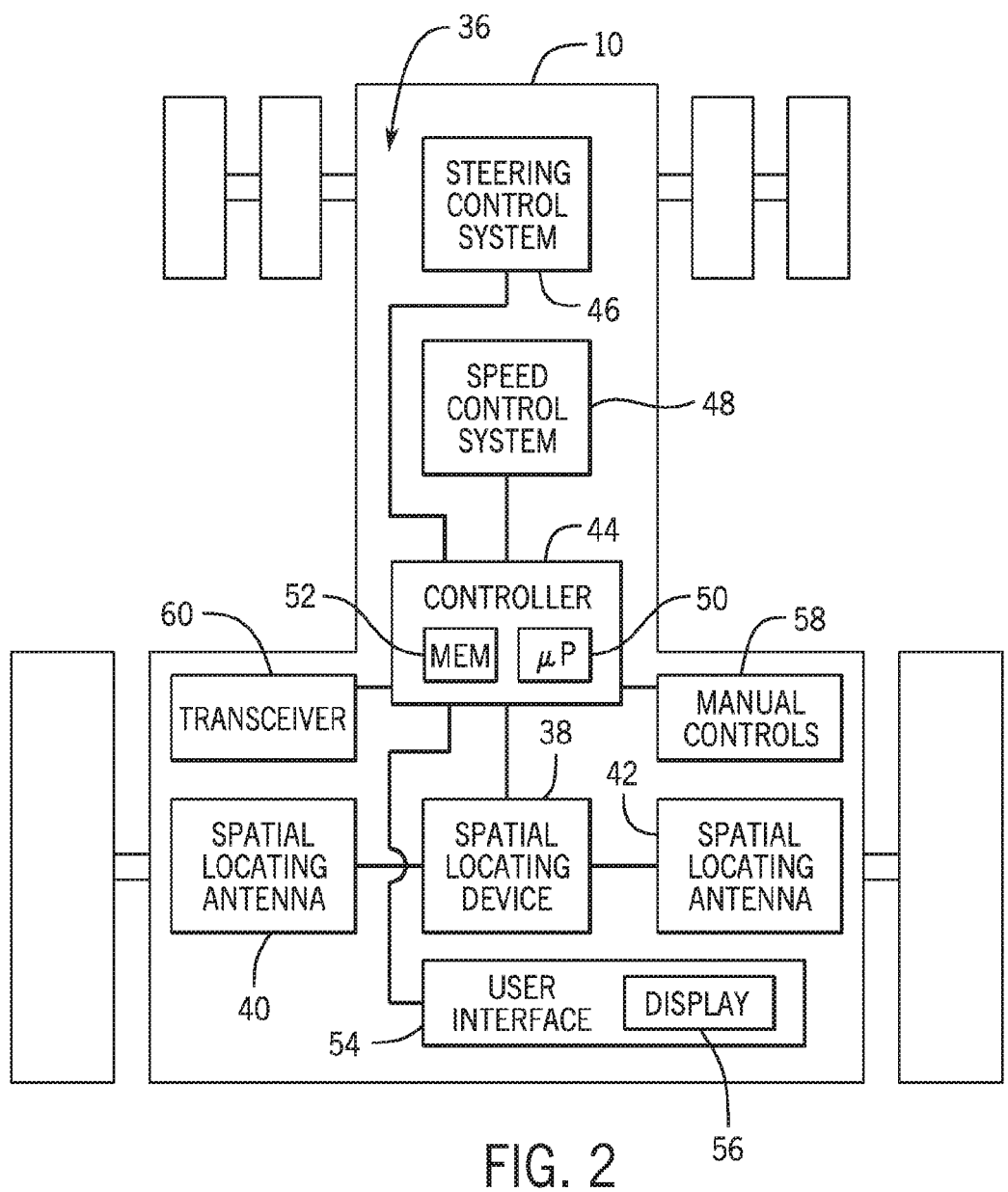
FIG. 2 is a schematic diagram of an embodiment of a control system that may be employed within the autonomous agricultural vehicle of FIG. 1.

FIG. 2 is a schematic diagram of an embodiment of a control system 36 that may be employed within the agricultural vehicle 10 of FIG. 1. In the illustrated embodiment, the control system 36 includes a spatial locating device 38, which is mounted to the autonomous agricultural vehicle 10 and configured to determine a position, and in certain embodiments a velocity, of the autonomous agricultural vehicle 10. As will be appreciated, the spatial locating device 38 may include any suitable system configured to measure and/or determine the position of the autonomous agricultural vehicle 10, such as a GPS receiver, for example.

In the illustrated embodiment, the control system 36 also includes a first spatial locating antenna 40 and a second spatial locating antenna 42, each communicatively coupled to the spatial locating device 38. Each spatial locating antenna is configured to receive spatial locating signals (e.g., GPS signals from GPS satellites) and to output corresponding spatial locating data to the spatial locating device 38. As discussed in detail below, the spatial locating antennas 40 and 42 are positioned on opposite lateral sides of the longitudinal centerline 26. The spatial locating device 38 is configured to determine the position of each spatial locating antenna (e.g., based at least in part on the spatial locating signals). The spatial locating device 38 and/or a controller 44 of the control system 36 is configured to determine the orientation of the autonomous agricultural vehicle 10 based at least in part on the position of each spatial locating antenna. Increasing the lateral separation distance between the spatial locating antennas may increase the accuracy of the vehicle orientation determination. Accordingly, in certain embodiments, the spatial locating antennas are positioned beneath rear fenders of the autonomous agricultural vehicle to increase the lateral separation distance between the spatial locating antennas (e.g., as compared to spatial locating antennas mounted on a roof of an operator cab). While the illustrated control system 36 includes two spatial locating antennas, it should be appreciated that in alternative embodiments, the control system may include more or fewer spatial locating antennas (e.g., 1, 2, 3, 4, 5, 6, or more).

In certain embodiments, the control system may also include an inertial measurement unit (IMU) communicatively coupled to the controller and configured to enhance the accuracy of the determined position and/or orientation. For example, the IMU may include one or more accelerometers configured to output signal(s) indicative of acceleration along the longitudinal axis, the lateral axis, the vertical axis, or a combination thereof. In addition, the IMU may include one or more gyroscopes configured to output signal(s) indicative of rotation (e.g., rotational angle, rotational velocity, rotational acceleration, etc.) about the longitudinal axis, the lateral axis, the vertical axis, or a combination thereof. The controller may determine the position and/or orientation of the agricultural vehicle based on the IMU signal(s) while the spatial locating signals received by the spatial locating antennas are insufficient to facilitate position determination (e.g., while an obstruction, such as a tree or building, blocks the spatial locating signals from reaching the spatial locating antennas). In addition, the controller may utilize the IMU signal(s) to enhance the accuracy of the determined position and/or orientation. For example, the controller may combine the IMU signal(s) with the spatial locating data and/or the position determined by the spatial locating device (e.g., via Kalman filtering, least squares fitting, etc.) to determine a more accurate position and/or orientation of the agricultural vehicle (e.g., by compensating for movement of the spatial locating antennas resulting from pitch and/or roll of the agricultural vehicle as the agricultural vehicle traverses uneven terrain).

In certain embodiments, the IMU and the spatial locating device may be disposed within a common housing. In further embodiments, the IMU and one spatial locating antenna may be disposed within a common housing. For example, each spatial locating antenna housing may include a spatial locating antenna and an IMU. Furthermore, in certain embodiments, a portion of the spatial locating device and one spatial locating antenna may be disposed within a common housing. For example, a first portion of the spatial locating device and the first spatial locating antenna may be disposed within a first housing, and a second portion of the spatial locating device and the second spatial locating antenna may be disposed within a second housing. In certain embodiments, a first IMU may be disposed within the first housing, and a second IMU may be disposed within the second housing.

In the illustrated embodiment, the control system 36 includes a steering control system 46 configured to control a direction of movement of the autonomous agricultural vehicle 10, and a speed control system 48 configured to control a speed of the autonomous agricultural vehicle 10. In addition, the control system 36 includes the controller 44, which is communicatively coupled to the spatial locating device 38, to the steering control system 46, and to the speed control system 48. The controller 44 is configured to automatically control the autonomous agricultural vehicle during certain phases of agricultural operations (e.g., without operator input, with limited operator input, etc.).

In certain embodiments, the controller 44 is an electronic controller having electrical circuitry configured to process data from the spatial locating device 38 and/or other components of the control system 36. In the illustrated embodiment, the controller 44 include a processor, such as the illustrated microprocessor 50, and a memory device 52. The controller 44 may also include one or more storage devices and/or other suitable components. The processor 50 may be used to execute software, such as software for controlling the autonomous agricultural vehicle, software for determining vehicle orientation, and so forth. Moreover, the processor 50 may include multiple microprocessors, one or more "general-purpose" microprocessors, one or more special-purpose microprocessors, and/or one or more application specific integrated circuits (ASICS), or some combination thereof. For example, the processor 50 may include one or more reduced instruction set (RISC) processors.

The memory device 52 may include a volatile memory, such as random access memory (RAM), and/or a nonvolatile memory, such as read-only memory (ROM). The memory device 52 may store a variety of information and may be used for various purposes. For example, the memory device 52 may store processor-executable instructions (e.g., firmware or software) for the processor 50 to execute, such as instructions for controlling the autonomous agricultural vehicle, instructions for determining vehicle orientation, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., position data, vehicle geometry data, etc.), instructions (e.g., software or firmware for controlling the autonomous agricultural vehicle, etc.), and any other suitable data.

In certain embodiments, the steering control system 46 may include a wheel angle control system, a differential braking system, a torque vectoring system, or a combination thereof. The wheel angle control system may automatically rotate one or more wheels and/or tracks of the autonomous agricultural vehicle (e.g., via hydraulic actuators) to steer the autonomous agricultural vehicle along a desired route (e.g., along the guidance swath, along headline turns, etc.). By way of example, the wheel angle control system may rotate front wheels/tracks, rear wheels/tracks, intermediate wheels/tracks, or a combination thereof, of the autonomous agricultural vehicle (e.g., either individually or in groups). The differential braking system may independently vary the braking force on each lateral side of the autonomous agricultural vehicle to direct the autonomous agricultural vehicle along a path. Similarly, the torque vectoring system may differentially apply torque from an engine to wheel(s) and/or track(s) on each lateral side of the autonomous agricultural vehicle, thereby directing the autonomous agricultural vehicle along a path. In further embodiments, the steering control system may include other and/or additional systems to facilitate directing the autonomous agricultural vehicle along a path through the field.

In certain embodiments, the speed control system 48 may include an engine output control system, a transmission control system, a braking control system, or a combination thereof. The engine output control system may vary the output of the engine to control the speed of the autonomous agricultural vehicle. For example, the engine output control system may vary a throttle setting of the engine, a fuel/air mixture of the engine, a timing of the engine, other suitable engine parameters to control engine output, or a combination thereof. In addition, the transmission control system may adjust a gear ratio of a transmission (e.g., by adjusting gear selection in a transmission with discrete gears, by controlling a continuously variable transmission (CVT), etc.) to control the speed of the autonomous agricultural vehicle. Furthermore, the braking control system may adjust braking force, thereby controlling the speed of the autonomous agricultural vehicle. In further embodiments, the speed control system may include other and/or additional systems to facilitate adjusting the speed of the autonomous agricultural vehicle.

In certain embodiments, the control system may also control operation of an agricultural implement coupled to the autonomous agricultural vehicle. For example, the control system may include an implement control system/implement controller configured to control a steering angle of the implement (e.g., via an implement steering control system having a wheel angle control system and/or a differential braking system) and/or a speed of the autonomous agricultural vehicle/implement system (e.g., via an implement speed control system having a braking control system). In such embodiments, the control system may be communicatively coupled to a control system/controller on the implement via a communication network, such as a controller area network (CAN bus).

In the illustrated embodiment, the control system 36 includes a user interface 54 communicatively coupled to the controller 44. The user interface 54 is configured to enable an operator (e.g., standing proximate to the autonomous agricultural vehicle) to control certain parameter(s) associated with operation of the autonomous agricultural vehicle. For example, the user interface 54 may include a switch that enables the operator to selectively configure the autonomous agricultural vehicle for autonomous or manual operation. In addition, the user interface 54 may include a battery cut-off switch, an engine ignition switch, a stop button, or a combination thereof, among other controls. In certain embodiments, the user interface 54 includes a display 56 configured to present information to the operator, such as a graphical representation of a guidance swath, a visual representation of certain parameter(s) associated with operation of the autonomous agricultural vehicle (e.g., fuel level, oil pressure, water temperature, etc.), a visual representation of certain parameter(s) associated with operation of an implement coupled to the autonomous agricultural vehicle (e.g., seed level, penetration depth of ground engaging tools, orientation(s)/position(s) of certain components of the implement, etc.), or a combination thereof, among other information. In certain embodiments, the display 56 may include a touch screen interface that enables the operator to control certain parameters associated with operation of the autonomous agricultural vehicle and/or the implement.

In the illustrated embodiment, the control system 36 includes manual controls 58 configured to enable an operator to control the autonomous agricultural vehicle while automatic control is disengaged (e.g., while unloading the autonomous agricultural vehicle from a trailer, etc.). The manual controls 58 may include manual steering control, manual transmission control, manual braking control, or a combination thereof, among other controls. In the illustrated embodiment, the manual controls 58 are communicatively coupled to the controller 44. The controller 44 is configured to disengage automatic control of the autonomous agricultural vehicle upon receiving a signal indicative of manual control of the autonomous agricultural vehicle. Accordingly, if an operator controls the autonomous agricultural vehicle manually, the automatic control terminates, thereby enabling the operator to control the autonomous agricultural vehicle.

In the illustrated embodiment, the control system 36 includes a transceiver 60 communicatively coupled to the controller 44. In certain embodiments, the transceiver 60 is configured to establish a communication link with a corresponding transceiver of a base station, thereby facilitating communication between the base station and the control system of the autonomous agricultural vehicle. For example, the base station may include a user interface that enables a remote operator to provide instructions to the control system (e.g., instructions to initiate automatic control of the autonomous agricultural vehicle, instructions to direct the autonomous agricultural vehicle along a path, etc.). The user interface may also enable a remote operator to provide data to the control system. The transceiver 60 may operate at any suitable frequency range within the electromagnetic spectrum. For example, in certain embodiments, the transceiver 60 may broadcast and receive radio waves within a frequency range of about 1 GHz to about 10 GHz. In addition, the transceiver 60 may utilize any suitable communication protocol, such as a standard protocol (e.g., Wi-Fi, Bluetooth, etc.) or a proprietary protocol.

In certain embodiments, the control system may include other and/or additional controllers/control systems, such as the implement controller/control system discussed above. For example, the implement controller/control system may be configured to control various parameters of an agricultural implement towed by the agricultural vehicle. In certain embodiments, the implement controller/control system may be configured to instruct actuator(s) to adjust a penetration depth of at least one ground engaging tool of the agricultural implement. By way of example, the implement controller/control system may instruct actuator(s) to reduce or increase the penetration depth of each tillage point on a tilling implement, or the implement controller/control system may instruct actuator(s) to engage or disengage each opener disc/blade of a seeding/planting implement from the soil. Furthermore, the implement controller/control system may instruct actuator(s) to transition the agricultural implement between a working position and a transport portion, to adjust a flow rate of product from the agricultural implement, or to adjust a position of a header of the agricultural implement (e.g., a harvester, etc.), among other operations. The agricultural vehicle control system may also include controller(s)/control system(s) for electrohydraulic remote(s), power take-off shaft(s), adjustable hitch(es), or a combination thereof, among other controllers/control systems.

Figure 3:
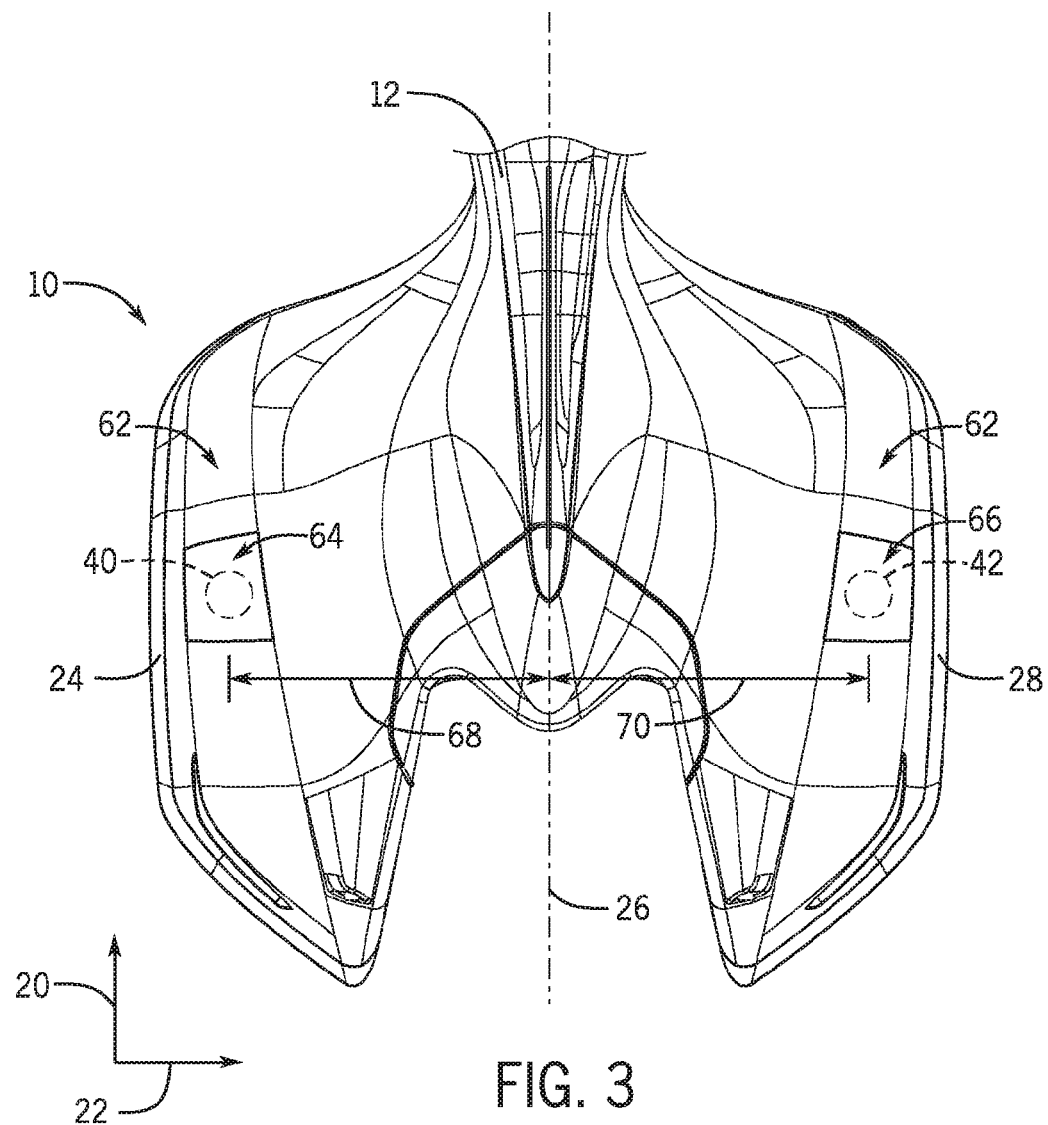
FIG. 3 is a top view of a portion of the autonomous agricultural vehicle of FIG. 1.

FIG. 3 is a top view of a portion of the autonomous agricultural vehicle 10 of FIG. 1. In the illustrated embodiment, the control system includes two spatial locating antennas. The first spatial locating antenna 40 is positioned beneath the first rear fender 24, and the second spatial locating antenna 42 is positioned beneath the second rear fender 28. Accordingly, a top side of each fender is positioned above a respective spatial locating antenna. In the illustrated embodiment, the top side of the first rear fender 24 extends beyond the lateral extent and the longitudinal extent of the first spatial locating antenna 40 (e.g., the extent of the first spatial locating antenna 40 along the lateral axis 22 and along the longitudinal axis 20), and the top side of the second rear fender 28 extends beyond the lateral extent and the longitudinal extent of the second spatial locating antenna 42 (e.g., the extent of the second spatial locating antenna 42 along the lateral axis 22 and along the longitudinal axis 20). However, it should be appreciated that in alternative embodiments, the top surface of at least one fender may only extend along a portion of the lateral extent and/or the longitudinal extent of the respective spatial locating antenna.

In certain embodiments, a coating 62 is disposed on at least a portion of an outer surface of the top side of the body 12. In the illustrated embodiment, the coating 62 is disposed on the outer surface of the top side of the first rear fender 24 and on the outer surface of the top side of the second rear fender 28. The coating 62 may include paint (e.g., metallic paint, flat paint, pearlescent paint, etc.), a decal (e.g., vinyl decal, etc.), another suitable type of coating (e.g., gel coat, polymeric coating, etc.), or a combination thereof. Certain coatings (e.g., metallic paints, paints having a high carbon content, etc.) may interfere with (e.g., at least partially block) the spatial locating signals. Accordingly, to facilitate passage of the spatial locating signals through the top side of each fender to the respective spatial locating antenna when such a coating is utilized, a first gap 64 in the coating 62 is formed over the first rear fender 24, and a second gap 66 in the coating 62 is formed over the second rear fender 28. Each gap is aligned with a respective spatial locating antenna, thereby facilitating passage of the spatial locating signals to the respective spatial locating antenna. In the illustrated embodiment, the first gap 64 extends beyond the lateral extent and the longitudinal extent of the first spatial locating antenna 40 (e.g., the extent of the first spatial locating antenna 40 along the lateral axis 22 and along the longitudinal axis 20), and the second gap 66 extends beyond the lateral extent and the longitudinal extent of the second spatial locating antenna 42 (e.g., the extent of the second spatial locating antenna 42 along the lateral axis 22 and along the longitudinal axis 20). However, it should be appreciated that in alternative embodiments, at least one gap may extend over a portion of the lateral extent and/or a portion of the longitudinal extent of the respective spatial locating antenna.

In certain embodiments, a second coating is disposed on the outer surface of the top side of at least one fender within the respective gap to enhance the appearance of the autonomous agricultural vehicle 10. The second coating is configured to facilitate passage of the spatial locating signals to the spatial locating antenna(s). For example, the second coating may include a non-metallic paint and/or a paint having a low carbon content (e.g., less than 10 percent, less than 5 percent, less than 1 percent, etc.). Alternatively or additionally, the second coating may include a decal (e.g., a vinyl decal) disposed on the outer surface of the top side of the fender within the gap.

As illustrated, the first spatial locating antenna 40 is positioned a first lateral distance 68 (e.g., distance along the lateral axis 22) from the longitudinal centerline 26, and the second spatial locating antenna 42 is positioned a second lateral distance 70 (e.g., distance along the lateral axis 22) from the longitudinal centerline 26. In the illustrated embodiment, the first lateral distance 68 is substantially equal to the second lateral distance 70. Each spatial locating antenna is positioned proximate to a distal end of the top side of the respective fender (e.g., proximate to the maximum lateral extent of the respective fender relative to the longitudinal centerline 26). As a result, the spatial locating antennas 40 and 42 are positioned a sufficient lateral distance away from one another to facilitate vehicle orientation determination. For example, each spatial locating antenna may be positioned a greater distance from the longitudinal centerline 26 than spatial locating antennas positioned on a roof of an operator cab. Accordingly, the accuracy of the vehicle orientation determination may be enhanced. Furthermore, because the spatial locating antennas are positioned beneath the fenders, the appearance of the autonomous agricultural vehicle may be enhanced, and/or the spatial locating antennas may be protected from dirt/debris within the field. In addition, the fenders may shield the spatial locating antennas from solar radiation, thereby reducing the temperature of the spatial locating antennas, as compared to spatial locating antennas mounted on an exterior surface of the vehicle body.

While one spatial locating antenna is positioned beneath each fender, it should be appreciated that in alternative embodiments, more or fewer spatial locating antennas may be positioned beneath each fender (e.g., 0, 1, 2, 3, 4, or more). In addition, in certain embodiments, one or more spatial locating antennas may be positioned beneath other portions of the body, such as below a top surface of the hood, among other locations (e.g., instead of spatial locating antennas positioned beneath the fenders or in addition to the spatial locating antenna(s) positioned beneath the fenders). In such embodiments, a coating on the body may include a gap to facilitate passage of the spatial locating signals through the body to the spatial locating antenna(s).

Figure 4:
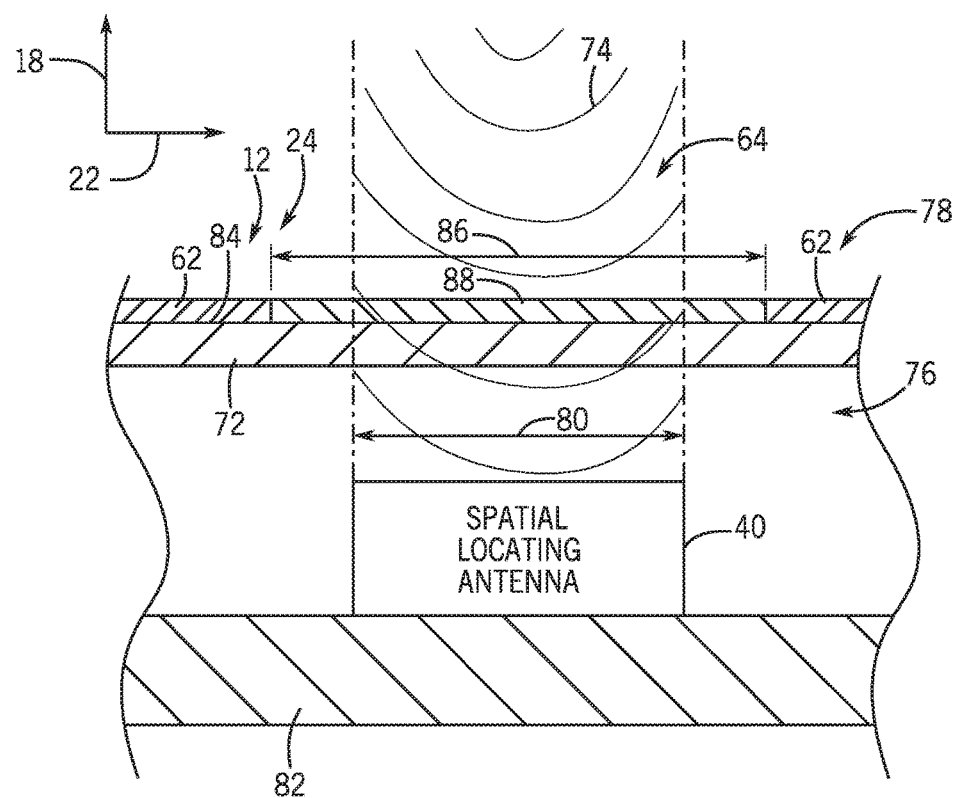
FIG. 4 is a cross-sectional view of an embodiment of a body that may be employed within the autonomous agricultural vehicle of FIG. 1.

FIG. 4 is a cross-sectional view of an embodiment of a body 12 that may be employed within the autonomous agricultural vehicle of FIG. 1. As illustrated, the first spatial locating antenna 40 is positioned beneath the first rear fender 24 of the body 12. Accordingly, a top side 72 (e.g., top wall) of the first rear fender 24 is positioned above the first spatial locating antenna 40 relative to the ground surface (e.g., the top side 72 is positioned above the spatial locating antenna 40 along the vertical axis 18). In certain embodiments, the body 12 is formed from a material that facilitates passage of the spatial locating signals 74 through the body 12, such as fiber glass or a polymeric material, among others. Accordingly, the spatial locating antenna 40, which is positioned on a first side 76 of the top side 72, may receive the spatial locating signals 74 through the top side 72 from a second side 78 to the first side 76. As illustrated, the top side 72 extends beyond the lateral extent 80 of the spatial locating antenna 40, and in certain embodiments, the top side 72 is formed from a continuous piece of material (e.g., fiber glass, a polymeric material, etc.). In the illustrated embodiment, the spatial locating antenna 40 is coupled to a frame 82 of the autonomous agricultural vehicle. However, it should be appreciated that in alternative embodiments, the spatial locating antenna may be coupled to other structures of the autonomous agricultural vehicle.

In the illustrated embodiment, a coating 62 is disposed on an outer surface 84 of the top side 72 of the body/fender. As illustrated, the outer surface 84 of the top side 72 faces away from the spatial locating antenna 40 (e.g., the outer surface 84 faces the second side 78). The coating 62 has a gap 64 aligned with the spatial locating antenna 40 to facilitate passage of the spatial locating signals through the body/fender to the spatial locating antenna 40. In the illustrated embodiment, the gap 64 extends beyond the lateral extent 80 of the spatial locating antenna 40. Accordingly, a lateral extent 86 of the gap 64 is greater than the lateral extent 80 of the spatial locating antenna 40. In certain embodiments, the gap may extend beyond the longitudinal extent of the spatial locating antenna.

In the illustrated embodiment, a second coating 88 is disposed on the outer surface 84 of the top side 72 of the body/fender within the gap 64. The second coating 88 is configured to facilitate passage of the spatial locating signals 74 to the spatial locating antenna 40. For example, the second coating 88 may include a non-metallic paint and/or a paint having a low carbon content (e.g., less than 10 percent, less than 5 percent, less than 1 percent, etc.). Alternatively or additionally, the second coating 88 may include a decal (e.g., a vinyl decal) disposed on the outer surface 84 of the top side 72 of the body/fender within the gap 64. In certain embodiments, other and/or additional coatings may be included. For example, a clear coat may be disposed on the coating 62 and/or the second coating 88. As used herein, "disposed on" includes directly disposed on and indirectly disposed on. Accordingly, a coating is considered to be disposed on a surface even if an intervening coating is present. For example, a base coat and/or a primer may be applied to the outer surface 84 of the top side 72 of the body/fender, and the coating 62 and/or the second coating 88 may be applied to the base coat/primer. In such a configuration, the coating 62 and/or the second coating 88 are considered to be disposed on the outer surface 84 of the top side 72 of the body/fender.

While FIG. 4 describes the body/fender and coating(s) with reference to the first spatial locating antenna 40, it should be appreciated that in certain embodiments, a similar configuration may be utilized for the second spatial locating antenna. Furthermore, in certain embodiments, the configuration disclosed above may be utilized for other antennas (e.g., an antenna of the transceiver, etc.) of the autonomous agricultural vehicle. For example, an antenna of the transceiver may be positioned on a first side of a wall of the body, and the antenna may be configured to receive a signal passing through the wall from a second side to the first side and/or to transmit a signal through the wall from the first side to the second side. In addition, a coating may be disposed on an outer surface of the wall facing the second side, and the coating may have a gap aligned with the antenna to facilitate passage of the signal through the wall. While the antenna mounting arrangement is described above with reference to an autonomous agricultural vehicle, it should be appreciated that in alternative embodiments, the antenna mounting arrangement may be utilized within other vehicles, such as manually control tractors, manually controlled harvesters, and the like.

While only certain features have been illustrated and described herein, many modifications and changes will occur to those skilled in the art. It is, therefore, to be understood that the appended claims are intended to cover all such modifications and changes as fall within the true spirit of the disclosure.

What is claimed is:
1. An off-road vehicle, comprising:
   a body having at least one fender positioned over at least one wheel or track of the off-road vehicle, wherein the at least one wheel or track is configured to engage a ground surface;
   at least one spatial locating antenna positioned beneath the at least one fender, wherein a top side of the at least one fender is positioned above the at least one spatial locating antenna relative to the ground surface, and the top side extends beyond a lateral extent and a longitudinal extent of the at least one spatial locating antenna; and a coating disposed on an outer surface of the top side of the at least one fender, wherein the outer surface of the top side faces away from the at least one spatial locating antenna, and the coating includes a gap aligned with the at least one spatial locating antenna to facilitate passage of a spatial locating signal through the at least one fender to the at least one spatial locating antenna.

2. The off-road vehicle of claim 1, wherein the at least one spatial locating antenna is communicatively coupled to a spatial locating device.

3. The off-road vehicle of claim 2, wherein the at least one spatial locating antenna comprises at least one global positioning system (GPS) antenna, and the spatial locating device comprises a GPS receiver.

4. The off-road vehicle of claim 1, wherein the at least one fender comprises a first fender positioned on a first lateral side of a longitudinal centerline of the off-road vehicle and a second fender positioned on a second lateral side of the longitudinal centerline, opposite the first lateral side.

5. The off-road vehicle of claim 4, wherein the at least one spatial locating antenna comprises a first spatial locating antenna positioned beneath the first fender and a second spatial locating antenna positioned beneath the second fender.

6. The off-road vehicle of claim 1, wherein the gap extends beyond the lateral extent of the at least one spatial locating antenna, the longitudinal extent of the at least one spatial locating antenna, or a combination thereof.

7. The off-road vehicle of claim 1, comprising a second coating disposed on the outer surface of the top side of the at least one fender within the gap, wherein the second coating is configured to facilitate passage of the spatial locating signal to the at least one spatial locating antenna.

8. The off-road vehicle of claim 7, wherein the second coating comprises a decal.

9. A vehicle, comprising:
a body having a first fender positioned over a first wheel or track of the vehicle and a second fender positioned over a second wheel or track of the vehicle, wherein the first wheel or track and the second wheel or track are configured to engage a ground surface, the first fender is positioned on a first lateral side of a longitudinal centerline of the vehicle, and the second fender is positioned on a second lateral side of the longitudinal centerline, opposite the first lateral side;
a first spatial locating antenna positioned beneath the first fender, wherein a top side of the first fender is positioned above the first spatial locating antenna relative to the ground surface, and the top side of the first fender extends beyond a lateral extent and a longitudinal extent of the first spatial locating antenna;
a second spatial locating antenna positioned beneath the second fender, wherein a top side of the second fender is positioned above the second spatial locating antenna relative to the ground surface, and the top side of the second fender extends beyond a lateral extent and a longitudinal extent of the second spatial locating antenna; and
a coating disposed on an outer surface of the top side of the first fender and on an outer surface of the top side of the second fender, wherein the outer surface of the top side of the first fender faces away from the first spatial locating antenna, the outer surface of the top side of the second fender faces away from the second spatial locating antenna, the coating includes a first gap aligned with the first spatial locating antenna to facilitate passage of a spatial locating signal through the first fender to the first spatial locating antenna, and the coating includes a second gap aligned with the second spatial locating antenna to facilitate passage of the spatial locating signal through the second fender to the second spatial locating antenna.

10. The vehicle of claim 9, wherein the first spatial locating antenna and the second spatial locating antenna are communicatively coupled to a spatial locating device.

11. The vehicle of claim 10, wherein the first spatial locating antenna comprises a first global positioning system (GPS) antenna, the second spatial locating antenna comprises a second GPS antenna, and the spatial locating device comprises a GPS receiver.

12. The vehicle of claim 9, wherein the first gap extends beyond the lateral extent of the first spatial locating antenna, the longitudinal extent of the first spatial locating antenna, or a combination thereof.

13. The vehicle of claim 9, wherein the second gap extends beyond the lateral extent of the second spatial locating antenna, the longitudinal extent of the second spatial locating antenna, or a combination thereof.

14. The vehicle of claim 9, comprising a second coating disposed on the outer surface of the top side of the first fender within the first gap, wherein the second coating is configured to facilitate passage of the spatial locating signal to the first spatial locating antenna.

15. The vehicle of claim 14, wherein the second coating comprises a decal.

16. The vehicle of claim 9, comprising a second coating disposed on the outer surface of the top side of the second fender within the second gap, wherein the second coating is configured to facilitate passage of the spatial locating signal to the second spatial locating antenna.

17. The vehicle of claim 16, wherein the second coating comprises a decal.

18. A vehicle, comprising:
a body having a fender positioned over a wheel or track of the vehicle, wherein the wheel or track is configured to engage a ground surface;
a spatial locating antenna positioned beneath the fender, wherein a top side of the fender is positioned above the spatial locating antenna relative to the ground surface, and the top side extends beyond a lateral extent and a longitudinal extent of the spatial locating antenna;
a first coating disposed on an outer surface of the top side of the fender, wherein the outer surface of the top side faces away from the spatial locating antenna, the first coating includes a gap aligned with the spatial locating antenna to facilitate passage of a spatial locating signal through the fender to the spatial locating antenna, and the gap extends beyond the lateral extent of the spatial locating antenna, the longitudinal extent of the spatial locating antenna, or a combination thereof; and
a second coating disposed on the outer surface of the top side of the fender within the gap, wherein the second coating is configured to facilitate passage of the spatial locating signal to the spatial locating antenna.

19. The vehicle of claim 18, wherein the second coating comprises a decal.

20. The vehicle of claim 18, wherein the spatial locating antenna is communicatively coupled to a spatial locating device.

* * * * *